United States Patent Office 3,705,898
Patented Dec. 12, 1972

3,705,898
CERTAIN 4 - AMINO - 2-(5-NITRO-2-THIENYL) QUINAZOLINES AND THE INTERMEDIATE 4 - CHLORO-(5 - NITRO-2-THIENYL)QUINAZOLINES THEREFOR
Robert J. Alaimo, Norwich, N.Y., assignor to Morton-Norwich Products, Inc.
No Drawing. Filed Jan. 26, 1970, Ser. No. 5,924
Int. Cl. C07d 99/06
U.S. Cl. 260—247.1   14 Claims

ABSTRACT OF THE DISCLOSURE

A series of 4-amino-2-(5-nitro-2-thienyl)quinazolines of the formula:

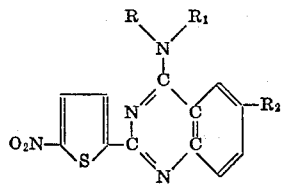

wherein R is hydroxy (lower) alkyl, dihydroxy (lower) or morpholinopropyl; $R_1$ is hydrogen, amino, or hydroxy (lower alkyl); $R_2$ is hydrogen or chloro; and R and $R_1$ taken together with —N is N-hydroxyethylpiperazino possess anthelmintic activity against Ascaris suum and Syphacia obvelata when perorally administered to infected mice. The members of the series are readily prepared by reacting 4-chloro-2-(5-nitro-2-thienyl)quinazoline with the appropriate amine.

This invention relates to chemical compounds. More particularly this invention is concerned with 4-amino-2-(5-nitro-2-thienyl)quinazolines of the formula:

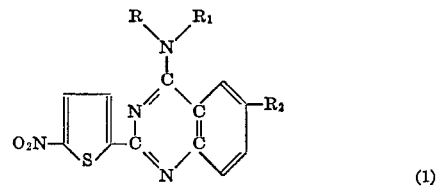

(1)

wherein R is hydroxy (lower) alkyl, dihydroxy (lower) alkyl, hydroxy (lower) alkoxy (lower) alkyl, (lower) alkyl or morpholinopropyl; $R_1$ is hydrogen, amino, or hydroxy (lower) alkyl; $R_2$ is hydrogen or chloro; and R and $R_1$ taken together with —N is N-hydroxyethylpiperazino. It is also concerned with the compound 4-chloro-2-(5-nitro-2-thienyl)quinozoline useful as an intermediate in the preparation of the substituted amino compounds.

The compounds of Formula I are valuable antimicrobial agents. They are particularly noteworthy as anthelmintics. Thus, when administered perorally to mice infected with Ascaris suum or Syphacia obvelata in doses ranging from 100 to 300 mg./kg. B.I.D. for a period up to five days, effective reduction of the parasite in the host is achieved. For oral administration usual pharmaceutical dosage forms are employed such as tablets, boluses, capsules, suspensions, and solutions wherein the excipients are those known to the pharmaceutical art and with which there is no incompatibility. The feed supply of animals is also a convenient carrier.

The method which is currently preferred for preparing the compounds of this invention consists in bringing together the 4-chloro-2-(5-nitro-2-thienyl) quinazoline and the appropriate amine. In effecting this reaction an inert solvent such as dimethylformamide is advantageously employed. Heating the mixture serves to hasten the completion of the reaction.

In order that this invention may be readily understood by and available to those skilled in the art these illustrative examples are appended:

EXAMPLE I 4-(2-hydroxyethylamino)-2-(5-nitro-2-thienyl) quinazoline (A) 1,2-dihydro-2-(5-nitro - 2 - thienyl)quinazolin-4 (3H)-one.—A solution of 5-nitro-2-thiophene carboxaldehyde (157.0 g., 1.0 mole) in ethanol (1000 ml.) was warmed on a steam bath and treated with 20 ml. of conc. HCl. To it was added with rapid stirring a warm solution of anthranilamide 136.0 g., 1.0 mole) in ethanol (500 ml). The reaction mixture was heated on a steam bath and stirred for 1 hour, then chilled in ice and filtered. The product was washed with aqueous ethanol and air dried (227 g. 82.5%). Recrystallization from ethanol yielded needles which melted at 219–221°.

Analysis.—Calcd. for $C_{12}H_9N_3O_3S$ (percent): C, 52.35; H, 3.29; N, 15.26. Found (percent): C, 52.60; H, 3.55; N, 15.10.

(B) 2-(5-nitro - 2 - thienyl)quinazolin-4(3H)one.—A mixture of (A) (245 g., 0.89 mole) and p-benzoquinone (120 g., 1.11 mole) in ethanol (1500 ml.) and dimethylformamide (600 ml.) was boiled under reflux with stirring for 6 hours. After chilling, the product was removed by filtration and stirred in ethanol (1000 ml.). Filtration and ether wash provided a yellow solid (160 g., 66%). Recrystallization from dimethylformamide/$H_2O$ provided needles which melted at 350–351°.

Analysis.—Calcd. for $C_{12}H_7N_3O_3S$ (percent): C, 52.74; H, 2.58; N, 15.38. Found (percent): C, 52.47; H, 2.61; N, 15.23.

(C) 4-chloro-2-(5-nitro-2-thienyl)quinazoline.—To a solution of (B) (68.0 g., 0.25 mole) in phosphorus oxychloride (500.0 ml.) was added phosphorus pentachloride (68.0 g., 0.33 mole). The mixture was stirred and boiled under reflux until all material went into solution, then heated for an additional 15 minutes. After cooling overnight at room temperature, the light brown material was removed by filtration and washed thoroughly with petroleum ether to give 65.0 g. (89.0%). Recrystallization from nitromethane provided crystals melting at 187–189°.

Analysis.—Calcd. for $C_{12}H_6ClN_3O_2S$ (percent): C, 49.40; H, 2.07; N, 14.41. Found (percent): C, 49.19; H, 2.08; N, 14.43.

(D) 4-(2-hydroxyethylamino) - 2 - (5-nitro-2-thienyl) quinazoline.—A mixture of (C) (50 g., 0.17 mole) and ethanolamine (24 g., 0.40 mole) in dimethylformamide (500 ml.) was heated on a steam bath with stirring for 5.5 hours. After treatment with charcoal, the hot solution was filtered and poured onto ice.

The precipitated product (45 g., 83%) was recrystallized from ethanol to give yellow crystals which melted at 213–215°.

*Analysis.*—Calcd. for $C_{14}H_{12}N_4O_3S$ (percent): C, 53.15; H, 3.82; N, 17.71. Found (percent): C, 53.34; H, 3.93; N, 17.46.

Other compounds of this invention can be prepared in a fashion similar to that shown in Example I(D). The table herebelow shows the amine to be reacted with the 4-chloro - 2 - (5 - nitro - 2 - thienyl)quinazoline, the product therefrom and the melting point and the analyzed carbon, hydrogen and nitrogen percentage thereof:

product was precipitated from the dimethylformamide solution with water and removed by filtration. After drying the product weighed 14.0 g. (62%). Recrystallization from methanol/dimethylformamide ($H_2O$) gave yellow crystals melting at 212–214°.

*Analysis.*—Calcd. for $C_{15}H_{13}ClN_4O_4S$ (percent): C, 47.31; H, 3.44; N, 14.71. Found (percent): C, 47.38; H, 3.39; N, 14.68.

| Example | Amine | Product | M.P., °C. | C | H | N |
|---|---|---|---|---|---|---|
| II | N-ethyl ethanolamine | 4-ethyl(2-hydroxyethyl)amino-2-(5-nitro-2-thienyl)quinazoline | 158–160 | 55.80 | 4.71 | 16.45 |
| III | 4-amino-1-butanol | 4-(4-hydroxy-1-butylamino)-2-(5-nitro-2-thienyl)quinazoline | 171–173 | 55.53 | 4.64 | 16.57 |
| V | N-(3-aminopropyl)morpholine | 4-(3-morpholininopropylamino)-2-(5-nitro-2-thienyl)quinazoline | 202–204 | 56–62 | 5.06 | 17.50 |
| V | 2-hydroxyethylpiperazine | 4-[4-(2-hydroxyethyl)piperazino]-2-(5-nitro-2-thienyl)quinazoline dihydrochloride hemihydrate | 283–284 | 46–47 | 4.62 | 14.95 |
| VI | 2,2'-iminodiethanol | 4-[bis(2-hydroxyethyl)amino]-2-(5-nitro-2-thienyl)quinazoline | 175–178 | 53.14 | 4.11 | 15.62 |
| VII | 1-amino-2,3-propanediol | 4-(2,3-dihydroxypropylamino)-2-(5-nitro-2-thienyl)quinazoline | 212–213 | 51–87 | 4.05 | 16.13 |
| VIII | 2-hydroxyethylhydrazine | 4-(2-hydroxyethyl-1-hydrazino)-2-(5-nitro-2-thienyl)quinazoline | 192–194 | 50.50 | 3.99 | 20.97 |
| IX | 2-[2-(3-aminopropoxy)ethoxy]ethanol | 4-<3-[2-[(2-hydroxyethoxy)ethoxy]propyl]amino>-2-(5-nitro-2-thienyl)quinazoline | 83–85 | 54.16 | 5.39 | 13.31 |
| X | 1,1'-iminodi-2-propanol | 4-(bis-2-hydroxypropylamino)-2-(5-nitro-2-thienyl)quinazoline | 159–161 | 55.35 | 5.24 | 14.45 |
| XI | Ethanolisopropanolamine | 4-[2-hydroxyethyl(2-hydroxypropyl)amino]-2-(5-nitro-2-thienyl)quinazoline | 158–160 | 54.59 | 4.89 | 14.95 |
| XII | N-butylethanolamine | 4-butyl(2-hydroxyethyl)amino-2-(5-nitro-2-thienyl)quinazoline | 137–139 | 57.84 | 5.40 | 15.05 |
| XIII | Ethanolpropanolamine | 4-[2-hydroxyethyl(3-hydroxypropyl)amino]-2-(5-nitro-2-thienyl)quinazoline | 166–168 | 54.48 | 4.81 | 15.00 |

EXAMPLE XIV 6-chloro-4-(2,3-dihydroxypropylamino)-2-(5-nitro-2-thienyl)quinazoline (A) 6-chloro - 1,2 - dihydro - 2 - (5-nitro - 2 - thienyl)quinazolin-4-(3H)-one.—A warm solution of 171 g. (1.0 mole) of 2-amino-5-chlorobenzamide in 2500 ml. of ethanol was treated with a warm solution of 157 g. (1.0 mole) of 5-nitro-2-thiophenecarboxaldehyde in 500 ml. of ethanol. The mixture was heated on a steam bath for 1 hour. The resulting solution was cooled in the refrigerator overnight and the product was collected by filtration in a yield of 208 g. (67%). Recrystallization from ethanol gave needles melting at 196–198°.

*Analysis.*—Calcd. for $C_{12}H_8ClN_3O_3S$ (percent): C, 46.53; H, 2.60; N, 13.57. Found (percent): C, 46.42; H, 2.54; N, 13.53.

(B) 6-chloro-2-(5 - nitro-2-thienyl)quinazolin-4(3H)-one.—A mixture of 200 g. (0.65 mole) of 6-chloro-1,2-dihydro - 2 - (5-nitro - 2 - thienyl)quinazolin-4(3H)-one in 1500 ml. of ethanol and 108 g. (1.0 mole) of p-benzoquinone was refluxed with stirring for 8 hours.

The mixture was cooled overnight. The product was collected by filtration, rinsed with ethanol, and was air dried to give 140 g. (71%).

Recrystallization from dimethylformamide gave yellow needles melting at 350° dec.

*Analysis.*—Calcd. for $C_{12}H_6ClN_3O_3S$ (percent): C, 46.84; H, 1.97; N, 13.66. Found (percent): C, 46.87; H, 1.95; N, 13.66.

(C) 4,6-dichloro - 2 - (5-nitro-2-thienyl)quinazoline.— A mixture of 140 g. (0.45 mole) of 6-chloro-2-(5-nitro-2-thienyl)quinazolin-4(3H)-one in 1000 ml. of phosphorus oxychloride and 150 g. (0.72 mole) of phosphorus pentachloride was heated to reflux, with stirring, for 15 minutes after completion of solution. The mixture was cooled in an ice bath and a tan solid was collected by filtration in a yield of 107 g. The filtrate was diluted with hexane and was filtered to give 21 g. The total yield was 128 g. (87%).

Recrystallization from nitromethane gave a solid melting at 167–169°.

*Analysis.*—Calcd. for $C_{12}H_5Cl_2N_3O_3S$ (percent): C, 44.19; H, 1.55; N, 12.87. Found (percent): C, 44.21; H, 1.53; N, 12.75.

(D) 6-chloro - 4 - (2,3-dihydroxypropylamino) - 2 - (5-nitro-2-thienyl)quinazoline.—A dimethylformamide solution (200 ml. of the chloro compound from part (C) (20 g., 0.06 mole) and 1-amino-2,3-propanediol (11 g., 0.12 mole) was heated on steam bath for 3 hours. The mixture was then treated with charcoal and filtered. The

EXAMPLE XV 6-chloro-4-[bis(β-hydroxyethyl)amino]-2-(5-nitro-2-thienyl)quinazoline A mixture 33 g. (0.1 mole) of 4,6-dichloro-2-(5-nitro-2-thienyl)quinazoline in 300 ml. of dimethylformamide was treated with 21 g. (0.2 mole) of bisethanolamine. The mixture was heated on a steam bath for 4 hours with stirring before diluting with water. After cooling, the product was collected, melting at 160–165°, in a yield of 32 g. (81%).

Recrystallization from nitromethane gave a melting point of 168–170°.

*Analysis.*—Calcd. for $C_{16}H_{15}ClN_4O_4S$ (percent): C, 48.67; H, 3.83; N, 14.19. Found (percent): C, 48.29; H, 3.78; N, 14.20.

What is claimed is:

1. A compound of the formula:

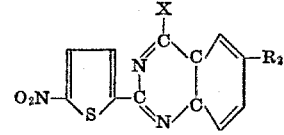

wherein X is

in which R is hydroxy $(C_2–C_4)$alkyl, dihydroxy propyl, 2-hydroxyethoxy ethoxypropyl, $(C_2–C_4)$alkyl or morpholinopropyl; $R_1$ is hydrogen, amino, or hydroxy $(C_2–C_4)$ alkyl; $R_2$ is hydrogen or chloro; and R and $R_1$ taken together with —N is N-hydroxyethylpiperazino.

2. The compound 4-(2-hydroxyethylamino)-2-(5-nitro-2-thienyl)quinazoline.

3. The compound 4-ethyl(2-hydroxyethylamino)-2-(5-nitro-2-thienyl)quinazoline.

4. The compound 4-(4-hydroxy-1-butylamino)-2-(5-nitro-2-thienyl)quinazoline.

5. The compound 4-(3-morpholinopropylamino)-2-(5-nitro-2-thienyl)quinazoline.

6. The compound 4-[4-(2-hydroxyethyl)piperazino]-2-(5-nitro-2-thienyl)quinazoline dihydrochloride hemihydrate.

7. The compound 4-[bis(2-hydroxyethyl)amino]-2-(5-nitro-2-thienyl)quinazoline.

8. The compound 4-(2,3-dihydroxypropylamino)-2-(5-nitro-2-thienyl)quinazoline.

9. The compound 4-(2-hydroxyethyl-1-hydrazino)-2-(5-nitro-2-thienyl)quinazoline.

10. The compound 4-<3{2-[(2-hydroxyethoxy)ethoxy]propyl}amino>-2-(5-nitro-2-thienyl)quinazoline.

11. The compound 4-(bis-2-hydroxypropylamino)-2-(5-nitro-2-thienyl)quinazoline.

12. The compound 4-[2-hydroxyethyl(2-hydroxypropyl)amino]-2-(5-nitro-2-thienyl)quinazoline.

13. The compound 4-butyl(2-hydroxyethyl)amino-2-(5-nitro-2-thienyl)quinazoline.

14. The compound 4-[2-hydroxyethyl(3-hydroxypropyl)amino]-2-(5-nitro-2-thienyl)quinazoline.

References Cited

UNITED STATES PATENTS 3,073,826  1/1963  Scarborough ____ 260—256.5 R

NICHOLAS S. RIZZO, Primary Examiner

R. J. GALLAGHER, Assistant Examiner

U.S. Cl. X.R.

260—251 Q, 256.5 R